United States Patent [19]
Maurer et al.

[11] 3,822,902
[45] July 9, 1974

[54] CONNECTION FOR PIPE JOINTS

[75] Inventors: William C. Maurer; Joe K. Heilhecker; Everett H. Lock, all of Houston, Tex.

[73] Assignee: Esso Production Research Company, Houston, Tex.

[22] Filed: Dec. 13, 1972

[21] Appl. No.: 314,871

[52] U.S. Cl.............. 285/94, 285/333, 285/332.2, 85/47
[51] Int. Cl............................................ F16l 21/02
[58] Field of Search............. 285/94, 333, 334, 347, 285/332.2, 106, 13, 14, 391, 355; 85/7, 47; 277/9, 70, 71, 77, 79

[56] References Cited
UNITED STATES PATENTS

| | | | |
|---|---|---|---|
| 2,104,799 | 1/1938 | Evans................................ | 285/332.2 |
| 2,140,467 | 12/1938 | Cargile.................................... | 85/47 |
| 3,139,786 | 7/1964 | Ardell....................................... | 85/7 |
| 3,150,889 | 9/1964 | Watts................................... | 285/334 |
| 3,667,784 | 6/1972 | Hokanson et al.................... | 285/334 |

*Primary Examiner*—James R. Boler
*Assistant Examiner*—Conrad L. Berman
*Attorney, Agent, or Firm*—Robert L. Graham

[57] ABSTRACT

A threaded connection for tubular goods includes an externally threaded pin member, an internally threaded box member, a resilient seal ring positioned between said pin and box members to provide a fluid seal therein, and a passage formed in either the pin or box members for conducting thread lubricant or other liquid away from the seal ring as the pin and box members are screwed together.

8 Claims, 5 Drawing Figures

CONNECTION FOR PIPE JOINTS

BACKGROUND OF THE INVENTION

1. Field of the Invention

This invention relates to a threaded connection for tubular goods. In one aspect it relates to a threaded connection for joining sections of high pressure drill pipe and drill collars.

2. Description of the Prior Art

The drill string used in rotary drilling operations normally consists of several sections of drill collars and drill pipe. These pipe sections are joined in end-to-end relation by threaded connections which are normally provided by tool joints. Although a variety of connections have been used in the past to join drill pipe and collars, the common connection used at the present is a type referred to by the American Petroleum Institute as the rotary shouldered connection. This connection employs tapered threads and pin and box shoulders which contact in abutting relation. The metal-to-metal contact between the shoulders provides the fluid tight seal for the connection. Under conventional drilling techniques, the rotary shouldered connection provides an adequate seal for the drill string. For high pressure service, however, resilient seal rings are sometimes employed to improve the seal at each joint. One of such arrangements includes a seal ring mounted at the base of the pin member and adapted to seal the interface of the contacting pin and box shoulders. This type of connection has proven particularly effective in drill pipe used in high pressure drilling which operates at hydraulic pressures up to 15,000 psi. A problem associated with the rotary shouldered connection provided with a resilient seal, however, has been that of maintaining the seal ring properly within its mounting cavity. Tests have shown that liquids such as mud or lubricant on the connection threads results in a buildup of pressure adjacent the seal ring as the tool joints are screwed together. This pressure buildup forces the seal ring out of its mounting cavity and between the shoulders of the pin and box members prior to the members being completely madeup. Thus when the shoulders are brought together the seal ring, sandwiched therebetween, is damaged with the result that a fluid tight seal is not obtained. The faulty assembly cannot be detected at the surface but under pressurized conditions a leak may develop. When this occurs, the high pressure drilling fluid quickly washes out the tool joint in the vicinity of the leak damaging both the pin and box members.

SUMMARY OF THE INVENTION

The present invention provides an improved threaded connection which is particularly useful in joining together tubular goods used in rotary drilling operations. Briefly, the improved connection includes a pin member having external threads formed thereon, a box member having internal threads formed therein, a resilient seal ring mounted at the base of the pin in a cavity defined by the pin and box members and a passage formed in either the pin or box members for conducting liquid confined between the pin and box members away from the seal ring to the interior of the pipe string. The flow passage prevents the buildup of pressure in the cavity as the members are screwed together. The passage preferably is in the form of a longitudinal groove extending transversely through the threads of the pin member. Tests performed on tool joints prepared in accordance with the present invention have shown that the pin and box members can be screwed together at normal rotational speeds without the seal ring being forced out of its mounting cavity.

DESCRIPTION OF THE PREFERRED EMBODIMENTS

Figure 1:
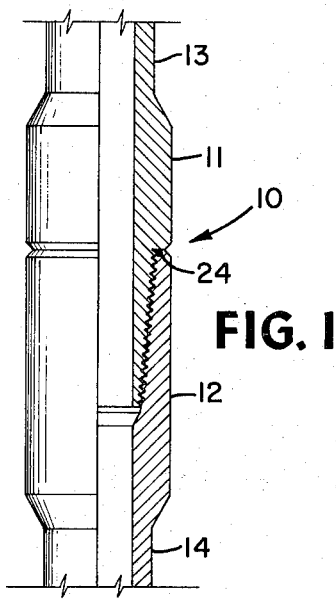
FIG. 1 is a side elevational view, shown partially in section, of a threaded connection constructed according to the present invention.

The drill string employed in rotary drilling operations is normally composed of several sections of steel pipe joined together in end-to-end relation by suitable threaded connections. The threaded connection of the present invention, indicated generally as 10 in FIG. 1, includes a pair of tool joints. One tool joint which will be referred to as the pin member 11 is connected to pipe section 13 and the other, referred to as box member 12, is connected to an adjacent pipe section 14. It will be understood that each pipe section of the drill string, e.g., pipe sections 13 and 14, will have secured to its opposite ends a pin member and a box member similar to those depicted in the drawings. The pin and box members 11 and 12 are normally connected to their associated pipe sections by welded connections, although threaded connections and integral tool joints have been used in the past.

The type of connection provided by the pin and box members 11 and 12 may conform to a variety of standards but the most common type used in rotary drilling operation is the rotary shouldered connection made in conformance with API standards (See API Specification for Rotary Drilling Equipment, 26th Edition, April, 1971, American Petroleum Institute, Washington, D.C.). The threads of this connection are tapered and are designed for rapid makeup. The metal-to-metal contact between the pin and box shoulders provide the seal for the connection. For purpose of illustration, the present invention will be described with reference to a rotary shouldered connection.

Figure 2:
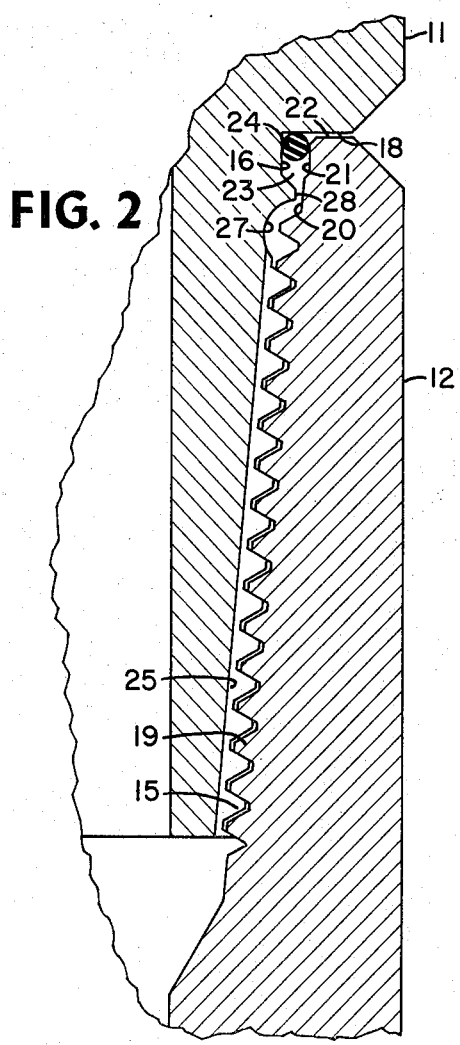
FIG. 2 is an enlarged fragmentary view of the threaded connection shown in FIG. 1.

As best seen in FIG. 2, the pin member 11 includes a pin provided with external threads 15 and an axial surface 16 formed at the pin base. A radial shoulder 18 extends outwardly from the base 16 to the outer periphery of the pin member 11. The outer edge of shoulder 18 may be beveled as illustrated. Shoulder 18 presents a Flat annular contact face for mating in metal-to-metal relation with the box shoulder as described below.

The box member 12 has internal threads 19 which are adapted to mate with the external threads 15 of pin member 11. Threads 15 and 19 for tool joints are usually taper threads. The outer end of the box member 12 is counterbored providing surface 20 which normally tapers the same degree as the taper of the threads 19. The outer tip of the box member 12 is further counterbored providing an axial extending surface 21. Extending outwardly from surface 21 is radial shoulder 22 which is adapted to contact shoulder 18 of the pin member 11 with the tool joints assembled. The inner and outer edges of the shoulder 22 may be beveled as illustrated.

In assembled relation, the box surfaces 20 and 21, in combination with the pin base 16, define an enclosed annular cavity 23. A resilient seal ring 24 is mounted in this cavity and provides a seal at the interface of the contacting shoulders 18 and 22. The seal ring 24 preferably is of the self-energizing type, e.g., internal pressure forces the seal ring into contact with the surfaces being sealed. Elastomeric O-rings are particularly suited for use in the present invention. The O-ring is sized in relation to the cavity to be slightly compressed between axial surfaces 16 and 21 with the members 11 and 12 assembled.

In accordance with one aspect of the present invention, the connection 10 is provided with a flow passage which extends from the cavity 23 to the interior of the pipe string. As discussed in more detail below, the flow passage serves to prevent the buildup of pressure on the high pressure side of cavity 23 thereby preventing the seal ring 24 from being forced out of the cavity. In a preferred embodiment, the flow passage is provided by at least one longitudinal groove 25 which extends transversely through the pin threads 15. The groove 25 provides fluid communication between cavity 23 and the interior of the drill string. It may be formed in the pin by milling out a peripheral portion of the threads thereof. The number of grooves 25 and the size of each should be sufficient to provide a flow area capable of conducting lubricant or other liquid trapped between the pin and box members 11 and 12 away from the cavity 23 as these members are screwed together. The groove 25 should not, however, be so large as to structurally weaken the pin member 11. The circumferential dimension of the groove preferably should be between about 0.05 and 0.50 radians. A circumferential groove 27 formed adjacent the pin base 16 and separated therefrom by a ridge 28 aids in conducting lubricant from the cavity 23 to the longitudinal grooves 25.

Figure 5:
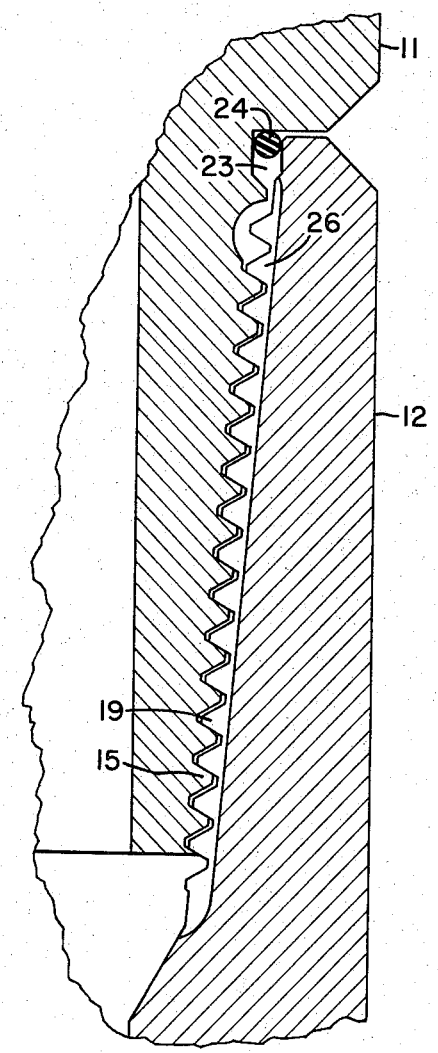
FIG. 5 is a view similar to FIG. 2 showing another embodiment of the threaded connection.

Other forms of the passage for relieving the pressure within cavity 23 include a groove 26 (or grooves) formed in the internal threads of the box member 12 (See FIG. 5), or radial passages formed within the pin member 11 and providing fluid communication between the interior of the drill string and the high pressure side of the seal.

As mentioned earlier, the seal ring 24 preferably is an elastomeric O-ring. Such rings are inexpensive and available in a wide variety of sizes and materials. The O-ring can be composed of natural rubber, polyisoprene, polybutadiene, ethylene-propylene rubber, neoprene, acrylonitrile-butadiene, and the like. Also useable are resinous materials such as one of the fluoroplastics, e.g. polytetrafluoroethylene, nylon, polycarbonate, and similar plastics capable of functioning as seals.

It again should be emphasized that the present invention contemplates the use of the improved connection in a variety of high pressure tubular goods. These tubular goods include tubing, casing, line pipe, drill pipe, and drill collars as well as subs used in such tubular goods.

Figure 3:
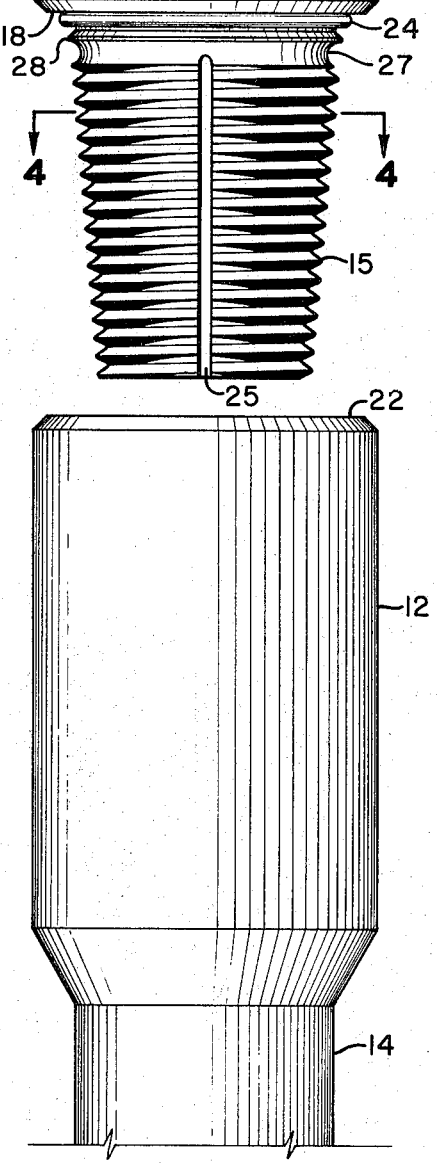
FIG. 3 is a side elevation view showing the pin member detached from the box member.

The effectiveness of the improved connection in preventing the seal ring 24 from being forced out of its mounting cavity 23 will best be understood with reference to FIGS. 2 and 3 illustrating tool joints for drill pipe. In FIG. 3, the pin member 11 of a pipe section 13 is placed in axial alignment with the box member 12 of an adjacent pipe section 14 preparatory to screwing the two members together. In practice, pipe section 14 represents the top joint of the drill string, and is suspended in the borehole on the rotary table. It is important that the threads of the pin and box members 11 and 12 be lubricated thoroughly to provide adequate protection against galling and prevent excessive makeup. A grease lubricant such as zinc base or lead base compound is thus normally applied to both the pin and box threads. The grease is normally liberally applied to make sure that adequate lubricant is available. With the threads lubricated, the upper pipe section 13 is lowered onto the lower pipe section 14 with the pin of the former entering the box of the latter. The upper pipe section 13 is then rotated rapidly until the pin and box shoulders 18 and 22 contact. As the pin member 11 approaches the madeup position, the O-ring 24 is compressed slightly between axial surfaces 21 and 16. The amount of compression is not large — about 10 percent of its original diameter. As the pin member 11 is screwed into the box member 12, lubricant in the valleys of the threads is forced through the channels between the male and female threads into a longitudinal groove 25 and from there downwardly to the interior of the pipe string. Lubricant also passes upwardly over shoulder 22 of the box member 12 until the outer periphery of O-ring 24 engages surface 21 of the box member 12. This closes the upper end of the assembly and prevents further escape of lubricant over shoulder 22. Continued downward axial movement of the shoulder 18 toward the madeup position forces lubricant within cavity 23 downwardly through the circumferential groove 27 and the longitudinal grooves 25. Lubricant remaining between the pin and box threads continues to pass circumferentially to the grooves 25 and from there downwardly to the interior of the drill pipe. Without the longitudinal grooves 25 formed in the threads 15, downward movement of the pin member 15 relative to the box member 12, with surface 21 engaging O-ring 24, causes a buildup of pressure within cavity 23 before shoulder 18 contacts shoulder 22. The pressure increase results from the inability of the lubricant to pass downwardly through the spiral channels defined by the pin and box threads. A buildup of pressure forces the O-ring outwardly between shoulders 18 and 22. This not only damages the O-ring 24 but prevents the shoulders from being properly mated. The effectiveness of the longitudinal grooves 25 results from the fact that the grease has a much shorter distance to travel to the interior of the drill string and thus can escape without creating a buildup of pressure within cavity 23.

The following tests demonstrate the effectiveness of the present invention. The tests were performed on a 4 inch I.F. API tool joint (pin member) modified in accordance with the present invention. A test rig included a box member made of a transparent acrylic resin sized and dimensioned to mate with the pin member. The transparency of the acrylic resin enabled the operator to observe the flow pattern of the lubricant as the pin and box members were screwed together.

Figure 4:
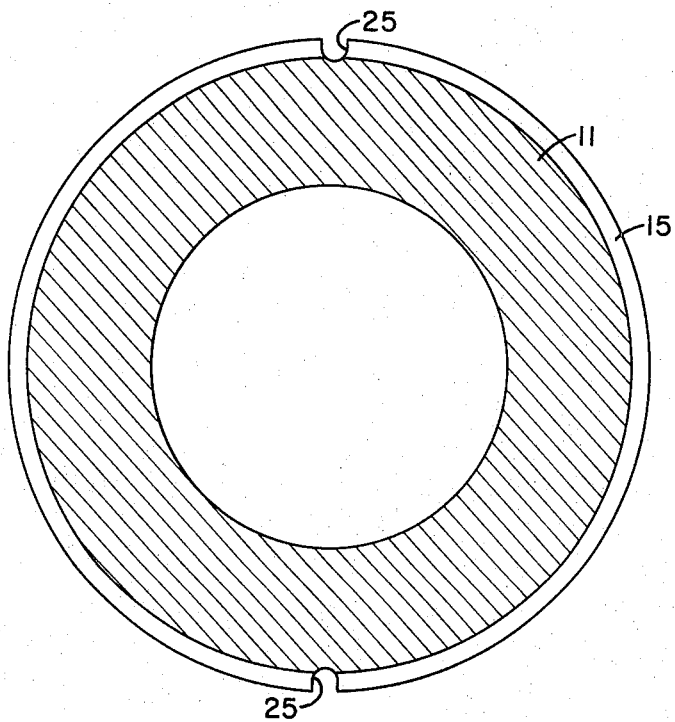
FIG. 4 is a transverse sectional view of the pin member shown in FIG. 3 with the cutting plane taken generally along line 4—4 thereof.

The 4 inch API tool joint was modified as follows:

a. The base 16 of the pin was milled to provide an outside diameter of 4.575 inches and an axial dimension of about one-fourth inches.

b. A circumferential groove shown as 27 in FIG. 1 was cut into the pin adjacent the base 16 with a ridge shown as 28 separating the base 16 and the groove 27. The cutting of groove 27 in the pin removed about two pin threads. The inside diameter of the groove 27 was 4-5/16 inches. The bottom of the groove was circular having a radius of curvature of about one-fourth inch. The axial dimension between the lower edge of the groove 27 and shoulder 18 was thirteen-sixteenths inch.

c. Two longitudinal and diametrically positioned grooves 25 were cut transversely through the threads of the pin using a three-sixteenths inch balling mill. The grooves were cut at the same taper as the pin threads. The bottom of the groove was about one sixty-fourth inch below the roots of the pin threads which provided a clearance of about 0.03 inch between the crest of the box threads and the bottom of the groove 25. (See FIG. 4).

The acrylic box member had the same dimensions as that of a 4 inch API tool joint except that an axial surface corresponding to surface 21 of FIG. 2 was formed in the outer end of the box. This surface had a diameter of 4.95 inches. A rubber O-ring, nominal size of 4½" × 4⅞" × 3/16", was positioned about the pin base. A commercial lubricant was applied to the pin member in sufficient amounts to substantially fill the grooves and valleys between the threads of the pin. With the pin member pointing upwardly, the box member was screwed onto the pin by hand until the pin and box shoulders contacted one another. During makeup, the lubricant was observed to pass circumferentially from the threads into the grooves and from there upwardly to the interior of the connection. At the fully madeup position, the O-ring was observed to be properly positioned within the mounting cavity and the shoulders mated in metal-to-metal contacting relation.

Similar tests were performed using the same acrylic box member and a standard 4-inch API tool joint provided with a conventional pin. The base of the pin was machined to receive a 4½" × 4⅞" ×3/16" O-ring. The 4 inch API tool joint was positioned with the pin pointing upwardly. A commercial lubricant was applied to the pin member and the acrylic box member was screwed onto the threads of the pin. In each test performed with this arrangement, the O-ring was forced out of the cavity between the confronting shoulders of the pin and box members preventing the members from being completely madeup.

A particularly advantageous feature of the present invention is that the seal ring and means for preventing the seal ring from being displaced during makeup can be obtained with only minor modification of conventional API tool joints. The flow passages for relieving the pressure in the O-ring cavity permits the pipe to be handled in a routine manner without danger of the O-ring being displaced from its mounting cavity.

What is claimed is:

1. A threaded connection for joining pipe which comprises:
    a pin member having external threads formed thereon;
    a box member having internal threads formed therein;
    said pin and box members in an assembled relationship defining an annular cavity at the base of the said pin member; and
    a resilient seal ring mounted in said cavity; said pin member or said box member having means formed therein defining a flow passage extending from said cavity to the interior of said pipe and being adapted to conduct lubricant between said members away from said cavity only to the interior of said pipe and thereby prevent the buildup of pressure in said cavity as said pin and box members are screwed together.

2. A connection as defined in claim 1 wherein said passage includes at least one longitudinal groove extending transversely through the threads of said pin member.

3. A connection as defined in claim 2 wherein the width of said groove is not greater than about 0.5 radians.

4. A connection as defined in claim 1 wherein said flow passage includes a plurality of longitudinal grooves circumferentially spaced about said pin member and extending transversely through the threads thereof.

5. A connection as defined in claim 1 wherein said seal ring is an elastomeric seal ring.

6. A connection as defined in claim 1 wherein said seal ring is an elastomeric O-ring.

7. A tool joint for joining pipe sections of a rotary drill string which comprises:
    a pin member having an externally threaded pin, an axial surface at the base of said pin, and a radial shoulder extending outwardly from the base of said pin;
    a box member having internal threads adapted to mate with said pin threads, an axial internal surface formed in its outer end, and a radial shoulder extending outwardly from said axial surface, said radial shoulder of said box member being adapted to contact said radial shoulder of said pin member; said axial surface and radial shoulder of said pin member in combination with said axial surface of said box member defining an annular cavity with said shoulders contacting one another;
    a resilient seal ring mounted on said pin member within said cavity for sealing the interface of said contacting shoulders; and
    at least one longitudinal groove extending transversely through the threads of said pin member providing fluid communication from said cavity to the interior of said drill string.

8. A tool joint as defined in claim 7 wherein said seal ring is an elastomeric O-ring.

* * * * *